(12) United States Patent
Brown et al.

(10) Patent No.: US 9,874,228 B2
(45) Date of Patent: Jan. 23, 2018

(54) NACELLE INLET WITH EXTENDED OUTER BARREL

(71) Applicant: Rohr, Inc., Chula Vista, CA (US)

(72) Inventors: Keith T. Brown, Bonita, CA (US); Frank J. Fowler, Bonita, CA (US); Stuart J. Byrne, San Diego, CA (US); Adam Stein, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 280 days.

(21) Appl. No.: 14/713,680

(22) Filed: May 15, 2015

(65) Prior Publication Data

US 2016/0377090 A1 Dec. 29, 2016

(51) Int. Cl.
*B64D 29/00* (2006.01)
*F04D 29/52* (2006.01)
*B64D 33/02* (2006.01)
*F02C 7/04* (2006.01)

(52) U.S. Cl.
CPC ............ *F04D 29/526* (2013.01); *B64D 29/00* (2013.01); *B64D 33/02* (2013.01); *F02C 7/04* (2013.01); *B64D 2033/0206* (2013.01); *B64D 2033/0226* (2013.01); *F05D 2210/34* (2013.01); *F05D 2260/96* (2013.01); *F05D 2260/963* (2013.01); *Y02T 50/672* (2013.01)

(58) Field of Classification Search
CPC ... B64C 7/02; F02C 7/04; F02C 7/045; F04D 29/526; B64D 2033/0226
See application file for complete search history.

(56) References Cited

U.S. PATENT DOCUMENTS

| | | | |
|---|---|---|---|
| 4,993,663 A | 2/1991 | Lahti et al. | |
| 5,137,230 A * | 8/1992 | Coffinberry | B64C 21/06 244/118.5 |
| 5,141,182 A | 8/1992 | Coffinberry | |
| 5,297,765 A | 3/1994 | Hughes et al. | |
| 6,059,524 A | 5/2000 | Costa et al. | |
| 6,340,135 B1 * | 1/2002 | Barton | B64D 29/00 244/53 B |
| 6,920,958 B2 | 7/2005 | Harrison | |
| 7,048,230 B2 | 5/2006 | Meyer | |
| 7,870,929 B2 | 1/2011 | Farstad | |
| 8,092,169 B2 | 1/2012 | Cloft | |

(Continued)

FOREIGN PATENT DOCUMENTS

FR 2990928 11/2013

OTHER PUBLICATIONS

Joslin, "Overview of Laminar Flow Control", Oct. 1998, NASA/TP-1998-208705.

(Continued)

*Primary Examiner* — Woody Lee, Jr.
(74) *Attorney, Agent, or Firm* — O'Shea Getz P.C.

(57) ABSTRACT

A nacelle inlet is provided for an aircraft propulsion system. This nacelle inlet includes an outer barrel, a bulkhead and a plurality of supports. The outer barrel extends around an axis and along the axis to an aft end. The bulkhead is within and connected to the outer barrel. An aft portion of the outer barrel projects axially aftward from the bulkhead to the aft end. The supports are disposed around the axis and next to the bulkhead. The supports are configured to support the aft portion of the outer barrel.

12 Claims, 8 Drawing Sheets

(56) References Cited

U.S. PATENT DOCUMENTS

| | | | | |
|---|---|---|---|---|
| 8,282,037 B2* | 10/2012 | Jain | ....................... | B64D 29/00 244/207 |
| 8,333,344 B2* | 12/2012 | Vauchel | ................. | B64D 29/06 244/1 N |
| 8,528,318 B2 | 9/2013 | Hendricks | | |
| 8,596,573 B2 | 12/2013 | Jain | | |
| 8,657,567 B2 | 2/2014 | Cloft | | |
| 8,777,163 B2 | 7/2014 | Safai | | |
| 8,839,805 B2 | 9/2014 | Zysman | | |
| 8,844,553 B2 | 9/2014 | Zysman | | |
| 9,188,025 B2* | 11/2015 | Calder | ................... | B64D 29/06 |
| 9,567,905 B2* | 2/2017 | Porte | ......................... | F02C 7/04 |
| 2005/0151026 A1* | 7/2005 | Meyer | ................... | B64D 33/02 244/204 |
| 2005/0218261 A1* | 10/2005 | Porte | ....................... | F01D 21/04 244/53 B |
| 2010/0260602 A1 | 10/2010 | Binks et al. | | |
| 2011/0197973 A1* | 8/2011 | Binks | ..................... | B64D 29/08 137/15.1 |

OTHER PUBLICATIONS

Joslin, "Aircraft Laminar Flow Control", Annual Review of Fluid Mechanics, 1998: vol. 31: 1-29.

Washburn, "Drag Reduction Status and Plans—Laminar Flow and AFC", Jan. 4-7, 2011, AIAA Aero Sciences Meeting.

European Commission, "Hybrid Laminar Flow Technology (HYLTEC)", Jan. 1, 1998.

John E. Green, "Laminar Flow Control—Back to the Future?", 38th Fluid Dynamics Conference and Exhibit, Jun. 23-26, 2008, AIAA 2008-3738.

Chambers, "Innovation in Flight", NASA SP-2005-4539, Aug. 22, 2005.

Braslow, "A History of Suction-Type Laminar-Flow Control with Emphasis on Flight Research", Monographs in Aerospace History #13, 1999.

EP search report for EP1616992.1 dated Oct. 17, 2016.

\* cited by examiner

_US 9,874,228 B2_

NACELLE INLET WITH EXTENDED OUTER BARREL

BACKGROUND OF THE INVENTION

1. Technical Field

This disclosure relates generally to an aircraft propulsion system and, more particularly, to a nacelle for an aircraft propulsion system.

2. Background Information

A nacelle for an aircraft propulsion system is the structure surrounding the propulsion engine and provides a housing for the engine and ancillary systems and aerodynamic surfaces to reduce drag. A nacelle is configured with an inlet for directing air into the propulsion system. The nacelle inlet is also configured to begin guiding air around the exterior of the propulsion system in an aerodynamically efficient fashion. Active and passive laminar flow systems have been proposed for the exterior of the inlet to reduce the skin friction drag of the air passing around the exterior by maintaining laminar flow. However, any step or gap will cause the flow around the exterior to trip to turbulent flow. The split line between the inlet and the fan cowl (directly aft of the inlet) will trip the flow and, thus, it marks a practical boundary for the laminar flow region of the nacelle.

SUMMARY OF THE DISCLOSURE

According to an aspect of the invention, a nacelle and its inlet are configured to shift a split line between the nacelle inlet and a fan cowl and thereby a laminar flow boundary farther aft to increase surface area for potential laminar flow and reduce drag.

According to another aspect of the invention, a nacelle inlet is provided for an aircraft propulsion system. This nacelle inlet includes an outer barrel, a bulkhead and a plurality of supports. The outer barrel extends around an axis and along the axis to an aft end. The bulkhead is within and connected to the outer barrel. An aft portion of the outer barrel projects aftward axially from the bulkhead to the aft end. The supports are disposed around the axis and next to the bulkhead. The supports are configured to support the aft portion of the outer barrel.

According to another aspect of the invention, an assembly is provided for an aircraft propulsion system. This assembly includes a fan containment case extending along an axis. The assembly also includes a nacelle inlet extending along the axis and around the fan containment case. The nacelle inlet includes a bulkhead, an outer skin and a plurality of supports. The bulkhead is within and connected to the outer skin. The outer skin axially overlaps the fan containment case. The supports are disposed around the axis and configured to support the outer skin over the fan containment case.

A first of the supports may be configured as or otherwise include a gusset mounted to and extending between the bulkhead and the outer skin.

The assembly may include an active laminar flow control system. This system may include a plenum fluidly coupled with a plurality of perforations in the outer skin axially aft of the bulkhead.

A first of the supports may be configured as or otherwise include a gusset.

A first of the supports may be configured as or otherwise include a strut.

A first of the supports may be mounted to and extend between the bulkhead and the aft portion of the outer barrel.

The nacelle inlet may include a fan containment case attachment ring. The bulkhead and a first of the supports may be independently mounted to the attachment ring.

The nacelle inlet may include a second bulkhead within and connected to the outer barrel. The bulkhead may be axially between the second bulkhead and the aft end.

The nacelle inlet may include an inlet lip forming an inlet orifice of the nacelle inlet. At least a circumferential portion of the inlet lip and a circumferential portion of the outer barrel may be integrally formed together from a monolithic outer skin.

The nacelle include may include an inlet lip forming an inlet orifice of the nacelle inlet. The inlet lip may be discrete from and attached to the outer barrel.

The nacelle inlet may include an acoustic panel circumscribed by the outer barrel. The aft portion of the outer barrel may project axially beyond and aft of the acoustic panel to the aft end.

The nacelle inlet may include a plenum for an active laminar flow control system. The outer barrel may be perforated with a plurality of perforations that are fluidly coupled with the plenum. The plenum may be axially forward or aft of the bulkhead.

The nacelle inlet may include a plenum for an active laminar flow control system. The aft portion of the outer barrel may be perforated with a plurality of perforations that are fluidly coupled with the plenum.

The nacelle inlet may include a plurality for plenums for an active laminar flow control system. The outer barrel may be perforated with a plurality of perforations that are respectively fluidly coupled with the plenums. At least two of the plenums may be axially forward of the bulkhead. At least one of the plenums may be axially aft of the bulkhead.

The foregoing features and the operation of the invention will become more apparent in light of the following description and the accompanying drawings.

DETAILED DESCRIPTION OF THE INVENTION

Figure 1:
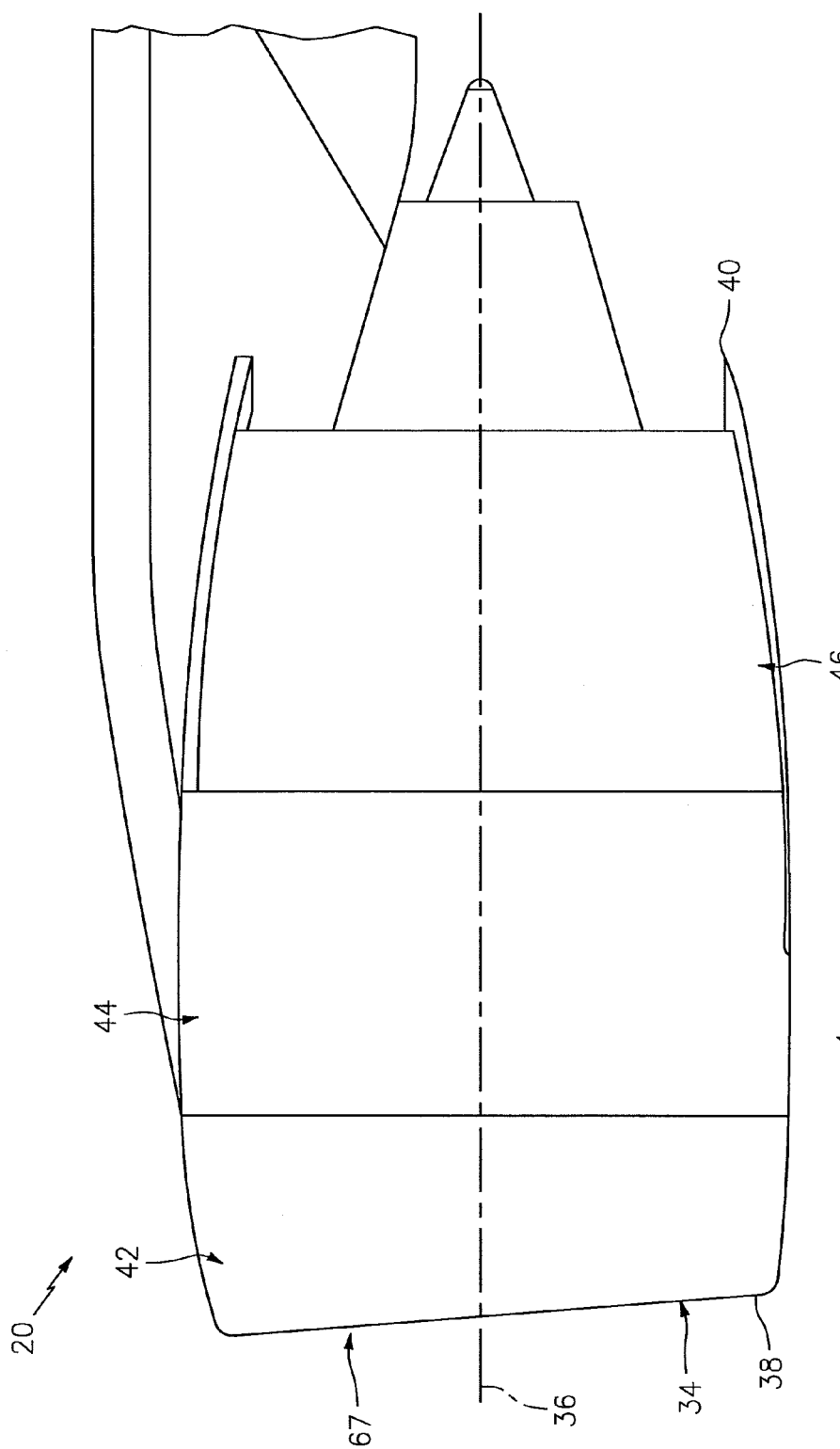
FIG. 1 is a side view illustration of an aircraft propulsion system.
Figure 2:
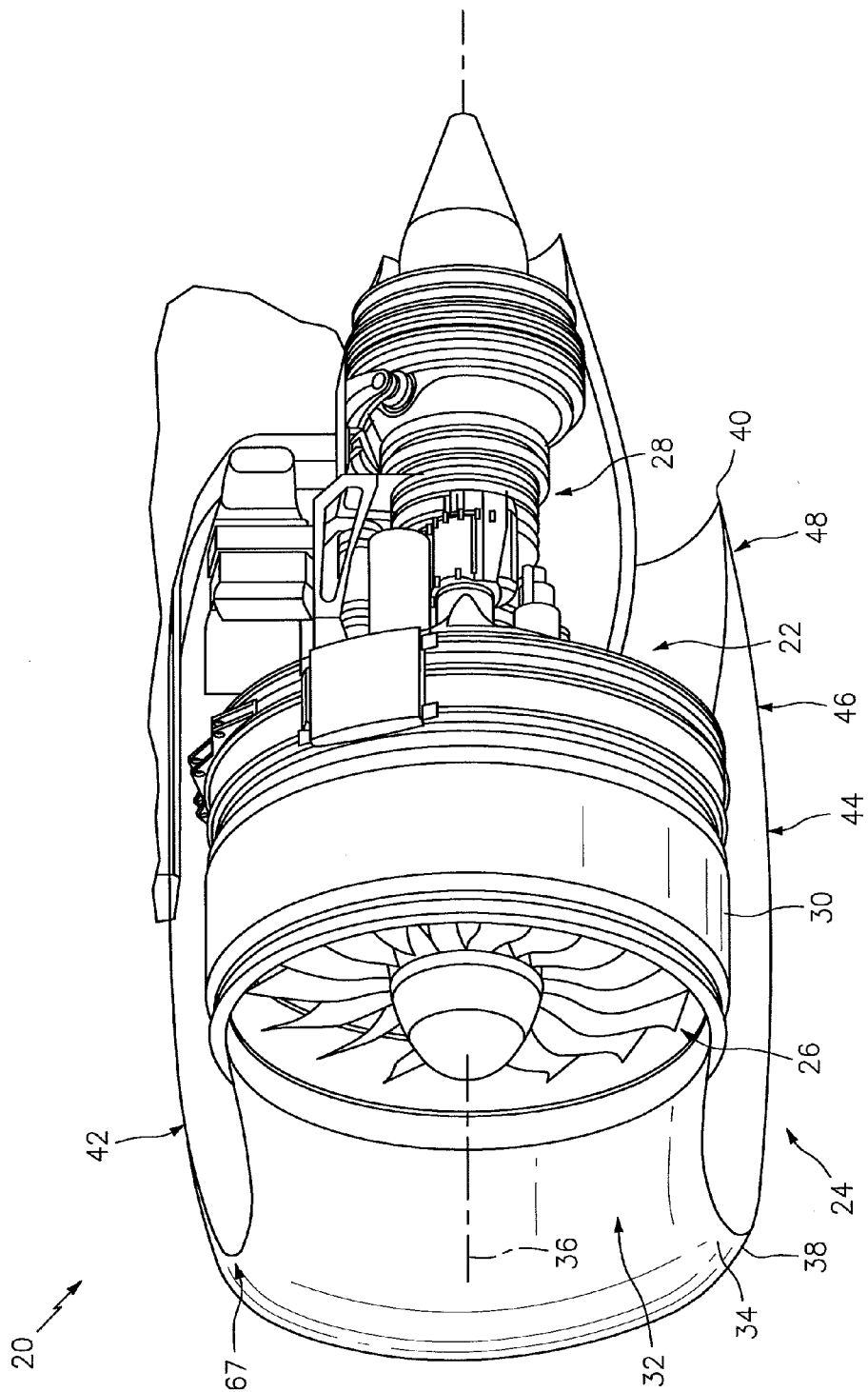
FIG. 2 is a perspective side cutaway illustration of the aircraft propulsion system.

FIGS. 1 and 2 illustrate an aircraft propulsion system 20 that includes a gas turbine engine 22 housed within a nacelle 24. The turbine engine 22 may be configured as a turbofan engine. The turbine engine 22 of FIG. 2 includes a fan 26 and an engine core 28, which may include low and high pressure compressors, a combustor and high and low pressure turbines.

The fan 26 is configured with an array of fan blades. These fan blades are housed within a tubular fan containment case 30. The fan case 30 is configured to provide an outer radial boundary for a gas path 32 extending into the propulsion system 20 from an inlet orifice 34 and through the fan 26. The fan case 30 may also be configured to radially contain one or more of the fan blades and/or fan blade fragments where the blade(s) and/or blade fragment(s) are radially ejected from the fan rotor, for example after collision with a foreign object.

The nacelle 24 extends along an axis 36 between a forward end 38 and an aft end 40. The nacelle 24 includes a nacelle inlet 42, a fan cowl 44 and a thrust reverser 46. These components 42, 44 and 46 are arranged sequentially along the axis 36 with the nacelle inlet 42 at the forward end 38 and with the thrust reverser 46 at the aft end 40. The fan cowl 44 is generally axially aligned with the fan 26 and axially overlaps the fan case 30.

The nacelle inlet 42 is configured to direct a stream of air through the inlet orifice 34 and into the turbine engine 22. More particularly, the nacelle inlet 42 is configured to provide a bifurcation between (A) air flowing into the gas path 32 through the inlet orifice 34 and (B) air flowing around and outside of the propulsion system 20. The nacelle inlet 42 may also be configured to create and maintain laminar flow of the air flowing outside and adjacent to the nacelle 24 as described below in further detail. By promoting and/or extending laminar flow, the nacelle inlet 42 may reduce aerodynamic drag and increase propulsion system 20 efficiency.

Figure 3:
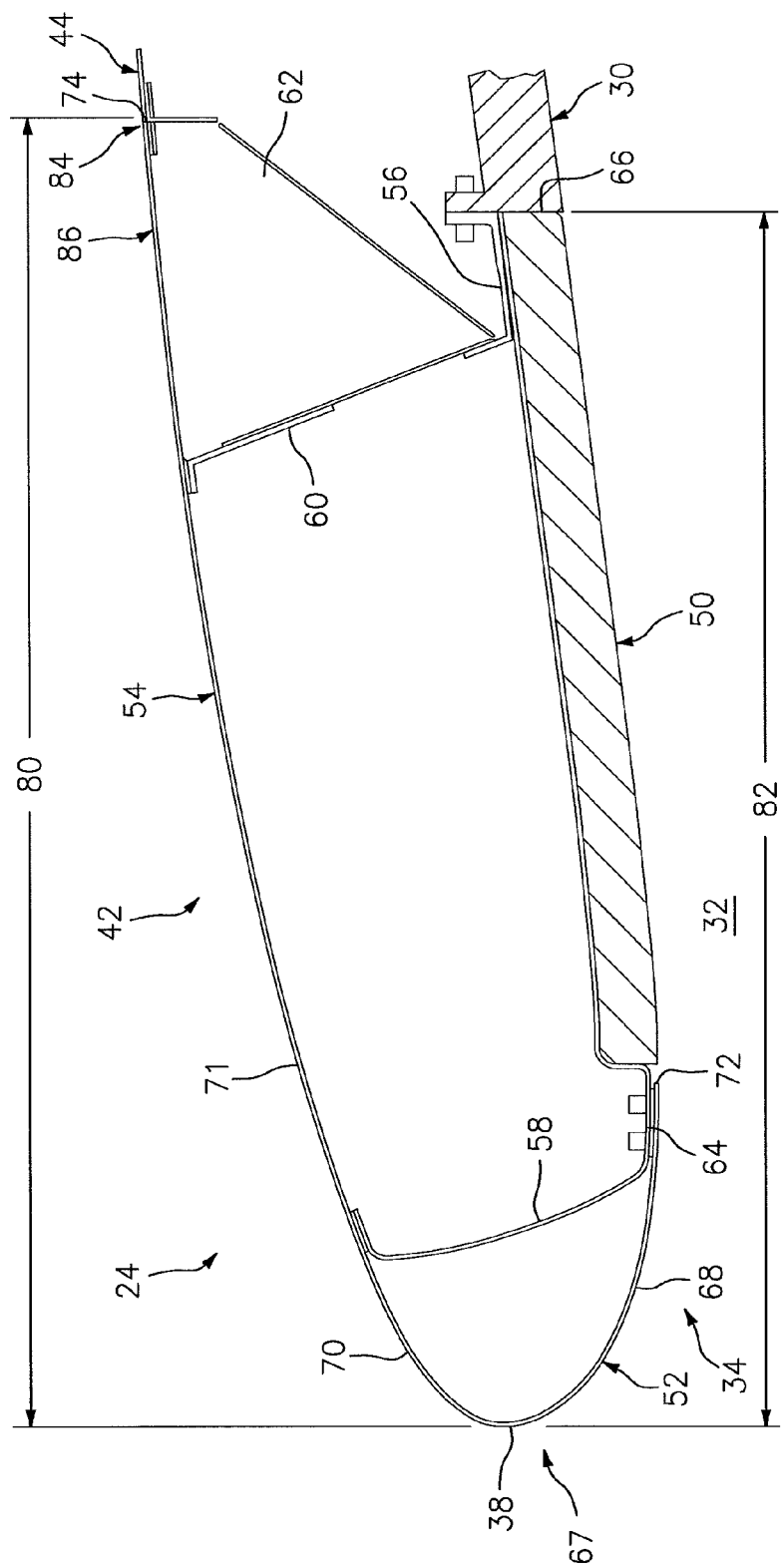
FIG. 3 is a side sectional illustration of a portion of a nacelle inlet for the aircraft propulsion system.

Referring to FIG. 3, the nacelle inlet 42 includes a tubular acoustic inner barrel 50, an annular inlet lip 52 and a tubular outer barrel 54. The nacelle inlet 42 also includes a fan case attachment ring 56, one or more bulkheads 58 and 60, and one or more supports 62.

The inner barrel 50 extends circumferentially around the axis 36. The inner barrel 50 extends axially along the axis 36 between a forward end 64 and an aft end 66.

The inner barrel 50 is configured to attenuate noise generated during propulsion system 20 operation and, more particularly for example, noise generated by rotation of the fan 26. The inner barrel 50, for example, may include at least one tubular acoustic panel or an array of arcuate acoustic panels arranged around the axis 36. Each acoustic panel may include a porous (e.g., honeycomb) core bonded between a perforated face sheet and a non-perforated back sheet, where the perforated face sheet faces radially inward and provides an outer boundary for an axial portion of the gas path 32. Of course, various other acoustic panel types and configurations are known in the art, and the present disclosure is not limited to any particular ones thereof.

The inlet lip 52 forms a leading edge 67 of the nacelle 24 as well as the inlet orifice 34 to the gas path 32. The inlet lip 52 has a cupped (e.g., generally U-shaped) cross-sectional geometry which extends circumferentially around the axis 36. The inlet lip 52 includes axially overlapping inner and outer lip portions 68 and 70.

The inner lip portion 68 extends axially from the outer lip portion 70 at the forward end 38 of the nacelle 24 and the inlet orifice 34 to the inner barrel 50. An aft end 72 of the inner lip portion 68 is attached to the forward end 64 of the inner barrel 50 with, for example, one or more fasteners; e.g., rivets, bolts, etc. The inner lip portion 68 may also or alternatively be bonded (e.g., welded, brazed, adhered, etc.) to the inner barrel 50. Of course, the present disclosure is not limited to any particular attachment techniques between the inlet lip 52 and the inner barrel 50.

The outer lip portion 70 extends axially from the inner lip portion 68 at the forward end 38 of the nacelle 24 to the outer barrel 54. The outer lip portion 70 and, more particularly, the entire inlet lip 52 may be formed integrally with the outer barrel 54. The inlet lip 52 and the outer barrel 54, for example, may be formed from a monolithic outer skin 71 such as, for example, a formed piece of sheet metal or molded composite material; e.g., fiber reinforcement within a polymer matrix. Such a monolithic outer skin 71 may extend longitudinally from the aft end 72 of the inner lip portion 68 to an aft end 74 of the outer barrel 54.

Figure 4:
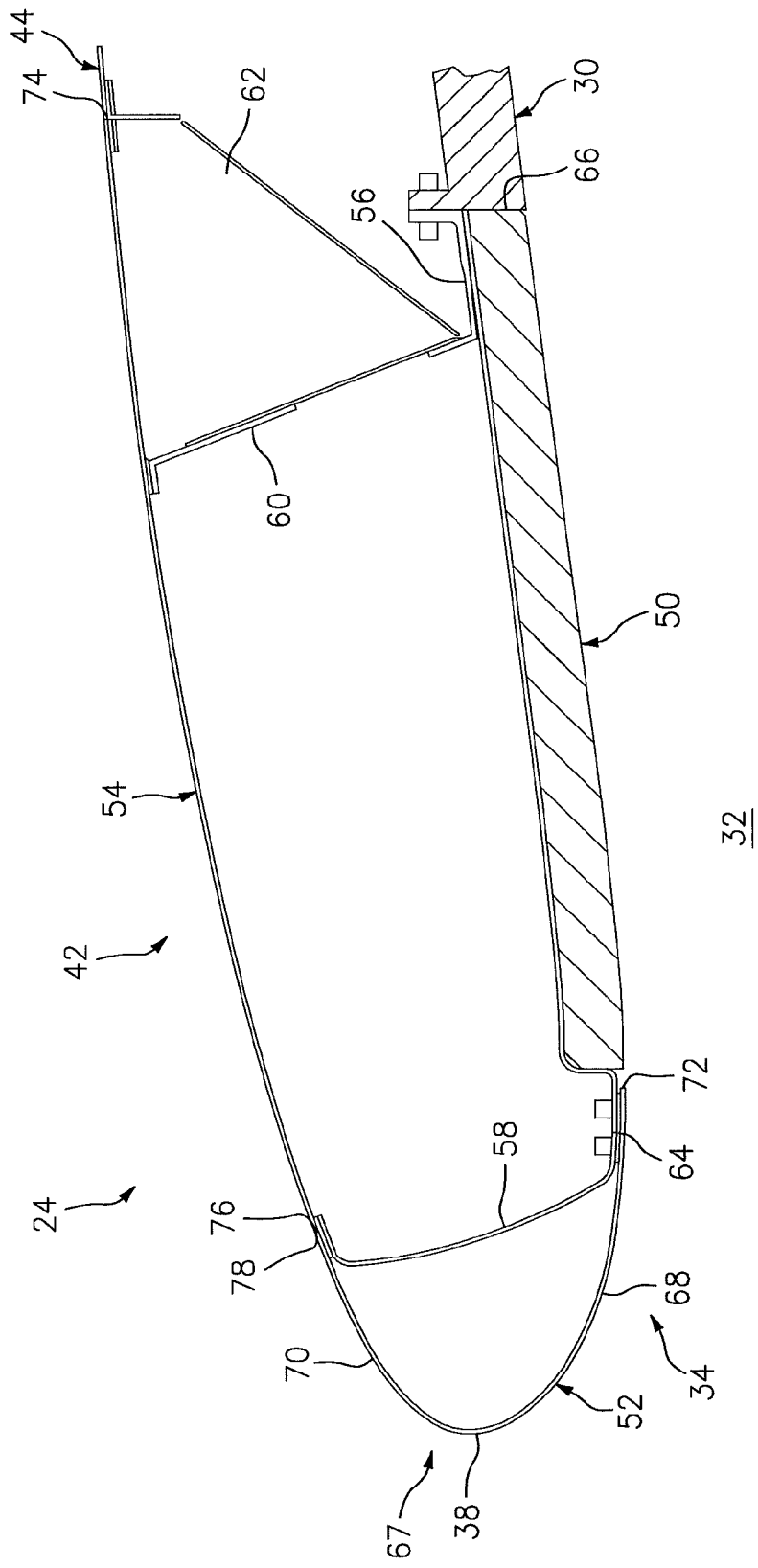
FIG. 4 is a side sectional illustration of a portion of another nacelle inlet for the aircraft propulsion system.

Alternatively, the inlet lip 52 may be formed discrete from the outer barrel 54 as shown in FIG. 4. In such an embodiment, an aft end 76 of the outer lip portion 70 is attached (e.g., mechanically fastened and/or bonded) to a forward end 78 of the outer barrel 54.

The inlet lip 52 and the outer barrel 54 may be configured as a single monolithic full hoop body. Alternatively, the inlet lip 52 and the outer barrel 54 may be formed from an array of arcuate segments (for example three segments each of 120 degrees) that are attached side-to-side circumferentially about the axis 36.

Referring again to FIG. 3, the outer barrel 54 extends circumferentially around the axis 36. The outer barrel 54 extends axially along the axis 36 between the inlet lip 52 and, more particularly, the outer lip portion 70 and the aft end 74 of the outer barrel 54. The outer barrel 54 is sized to axially project aft from the inner barrel 50 and the attachment ring 56, which is attached to the inner barrel 50 at its aft end 66. More particularly, an axial length 80 between the forward end 38 and the aft end 74 is greater than an axial length 82 between the forward end 38 and aft end 66.

Figure 5:
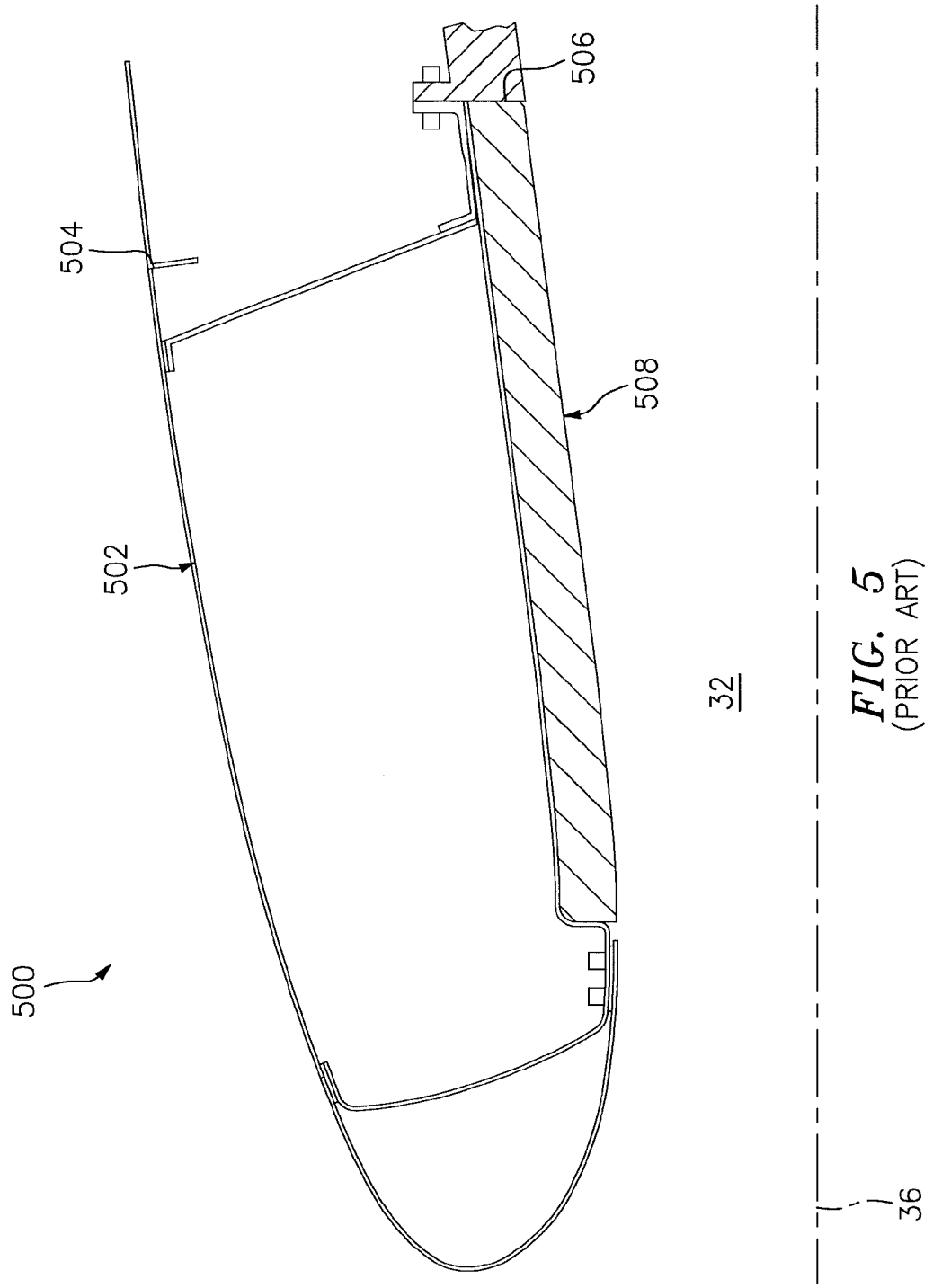
FIG. 5 is a side sectional illustration of a portion of a prior art nacelle inlet for an aircraft propulsion system.

With the foregoing configuration, a gap or joint 84 between the nacelle inlet 42 and the fan cowling 44 is moved axially aft as compared to a typical prior art nacelle 500 as shown in FIG. 5. In particular, the nacelle 500 of FIG. 5 includes an outer barrel 502 with an aft end 504 that is axially forward of an aft end 506 of its inner barrel 508. A joint such as the joint 84 between the nacelle inlet 42 and, more particularly, the outer barrel 54 and the fan cowling 44 can provide a trip point for air flowing along the nacelle 24 to trip from substantially laminar flow to turbulent flow. Thus, by moving the joint 84 axially aft along the nacelle 24 of FIG. 3, the nacelle inlet 42 of the present disclosure may increase the area of potential laminar flow along and/or around the nacelle 24.

Referring still to FIG. 3, the attachment ring 56 may be configured as a substantially annular body. The attachment ring 56 is axially located approximately at the aft end 66 of the inner barrel 50. The attachment ring 56 is configured to provide a structural mounting joint between the inner barrel 50 and the fan case 30. More particularly, the inner barrel 50 is mounted to a forward portion of the attachment ring 56 and the containment case 30 is mounted to an aft portion of the attachment ring 56. As previously described, an aft portion 86 of the outer barrel 54 axially overlaps a forward portion of the containment case 30.

The forward bulkhead 58 is axially located approximately at (e.g., proximate, adjacent or on) the aft end 72 of the inlet lip 52. The forward bulkhead 58 may be configured as a substantially annular body, which may be continuous or circumferentially segmented. The forward bulkhead 58 is attached to and extends radially between the inner lip portion 68 and the outer lip portion 70. The forward bulkhead 58 may be mechanically fastened to the inlet lip 52 with one or more fasteners. The forward bulkhead 58 may also or alternatively be bonded to the inlet lip 52.

The aft bulkhead 60 is axially located approximately at the aft end 66 of the inner barrel 50. The aft bulkhead 60 may be configured as a substantially annular body, which may be continuous or circumferentially segmented. The aft bulkhead 60 is attached to and extends radially between the outer barrel 54 and the inner barrel 50 and, more particularly, the attachment ring 56 which circumscribes and to which the inner barrel 50 is mounted as described above. The aft bulkhead 60 may be mechanically fastened to one or more of the components 50 and 56 with one or more fasteners. The aft bulkhead 60 may also or alternatively be bonded to one or more of the components 50 and 56.

The aft portion 86 of the outer barrel 54, which projects axially aft of the components 50 and 56 and axially overlaps the forward portion of fan case 30, is cantilevered from the aft bulkhead 60. To provide (e.g., radial) structural support for this cantilevered aft portion 86 of the outer barrel 54, the supports 62 are provided. These supports 62 are arranged circumferentially around the axis 36 in a circumferential array (see FIG. 6). Each of the supports 62 may be configured as a gusset, which is mounted to and extends between the aft bulkhead 60 and the aft portion 86 of the outer barrel 54. Each support 62 may axially engage the aft bulkhead 60 along its radial length; e.g., an entire axial side of each support 62 may contact the bulkhead 60 and have a radial height that is substantially equal to the radial length of the bulkhead 60. Each support 62 may radially engage the aft portion 86 of the outer barrel 54 along its axial length; e.g., an entire radial top side of each support 62 may contact the outer barrel 54 approximately from the aft bulkhead 60 to the aft end 74. Each support 62 may also be attached to the attachment ring 56.

Figure 7:
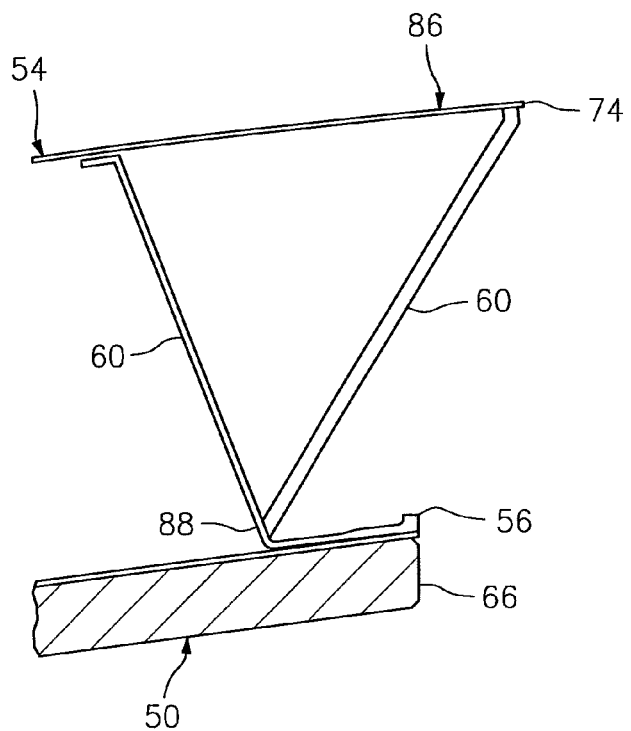
FIG. 7 is a side sectional illustration of a portion of another nacelle inlet for the aircraft propulsion system of FIGS. 1 and 2.
Figure 8:
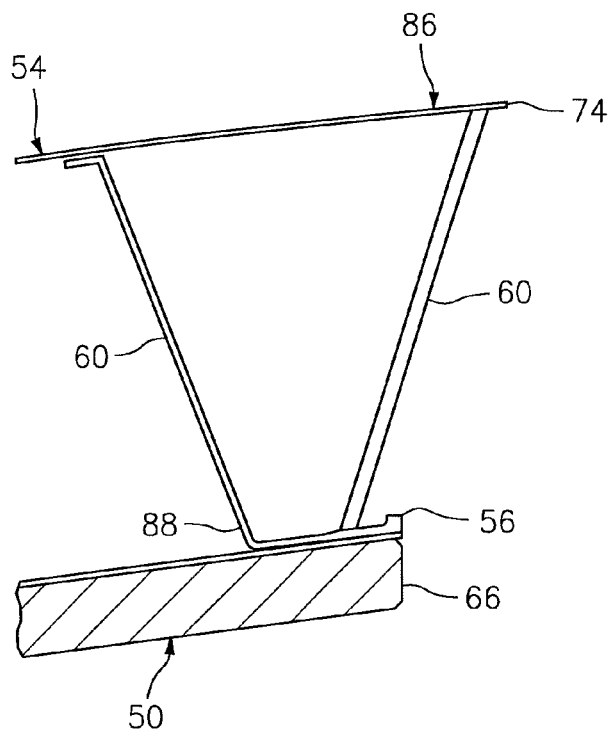
FIG. 8 is a side sectional illustration of a portion of another nacelle inlet for the aircraft propulsion system of FIGS. 1 and 2.

In other embodiments, as illustrated in FIGS. 7 and 8, one or more of the supports 62 may each be configured as a strut. This strut 62 may be mounted to the aft bulkhead 60 and/or the attachment ring 56 approximately at a radially inner end 88 of the aft bulkhead 60 (see FIG. 7). Alternatively, the strut 62 may be attached to the attachment ring 56 discrete (e.g., independent) from the aft bulkhead 60 (see FIG. 8). The strut 62 may be attached to the aft portion 86 of the outer barrel 54 approximately at the aft end 74. The strut 62 may be attached to each component 54, 56 and/or 60 by a rigid connection, or a moveable connection such as a bearing mount.

Figure 9:
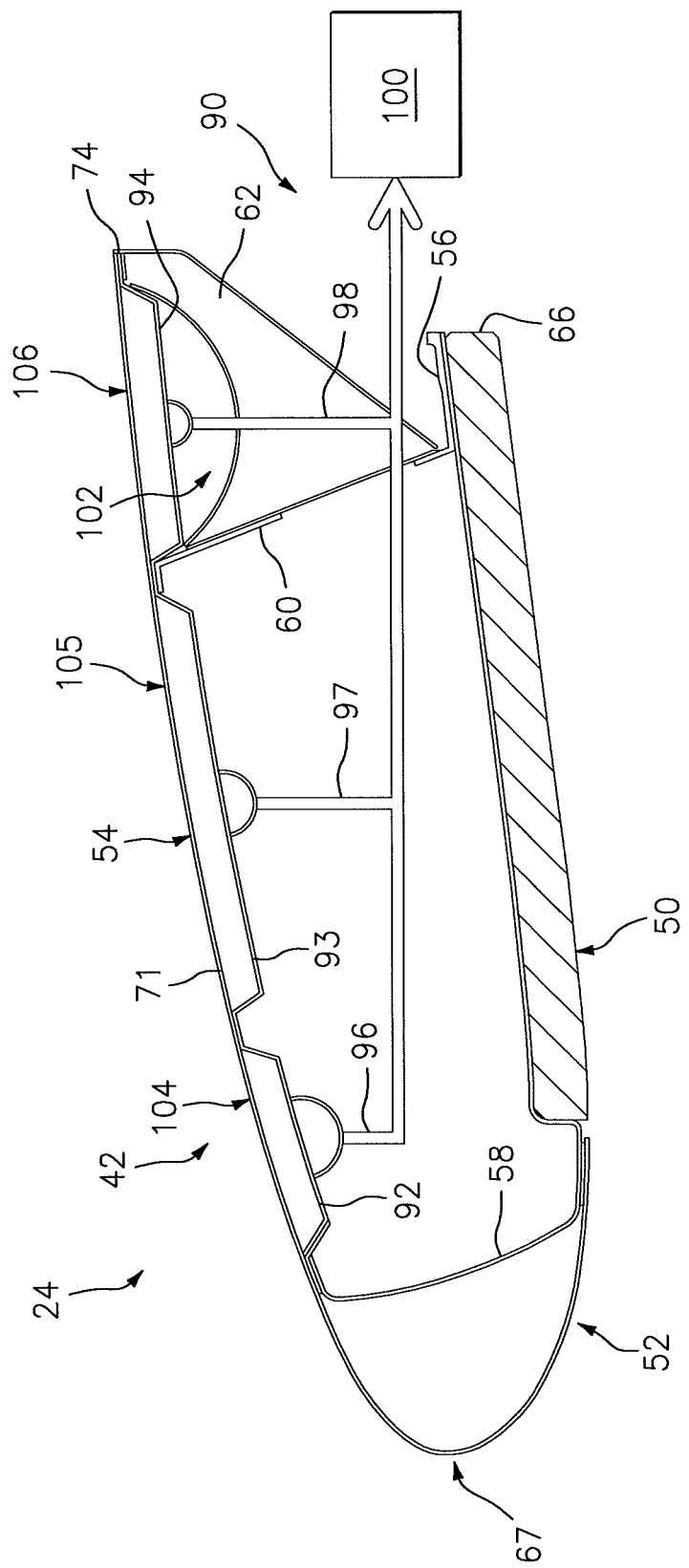
FIG. 9 is a side sectional illustration of a portion of another nacelle inlet for the aircraft propulsion system of FIGS. 1 and 2 configured with an active laminar flow control system.

Referring to FIG. 9, the propulsion system 20 may include an active laminar flow control (ALFC) system 90. This ALFC system 90 includes one or more circumferentially extending plenums 92, 93, 94, one or more conduits 96, 97, 98 and at least one suction source 100. The first and the second plenums 92 and 93 are located axially between the forward and the aft bulkheads 58 and 60, with the first plenum 92 axially forward of the second plenum 93. Instead of two plenums 92 and 93, this area between the two bulkheads might alternatively comprise a single plenum, or more than two plenums. The third plenum 94 is located axially between the aft bulkhead 60 and the aft end 74. Each of the plenums 92-94 is fluidly coupled with a plurality of perforations in the outer barrel 54, which in this embodiment is formed by selectively perforating respective regions 104, 105, 106 of the outer skin 71. The plenums 92-94 are respectively fluidly coupled with the suction device 100 through the conduits 96-98. The suction source 100 may be configured as a pump or a vacuum. The suction source 100 is operable to draw boundary layer air flowing along the outer barrel 54 into the ALFC system 90 so as to re-energize the boundary layer and actively promote laminar flow adjacent the nacelle 24, as will be understood by those of ordinary skill in this art.

Figure 6:
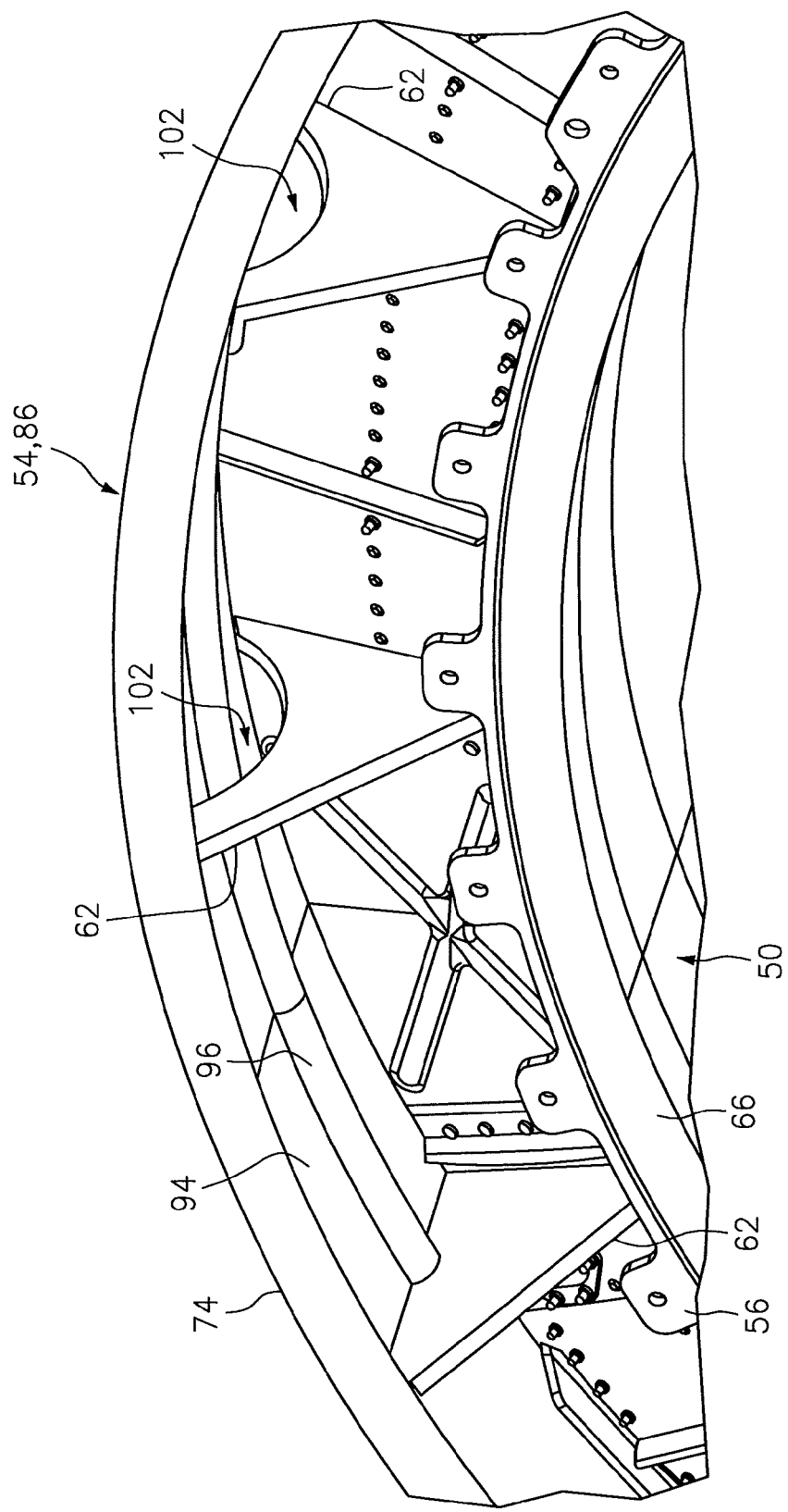
FIG. 6 is a perspective illustration of an aft end of a nacelle inlet.

In this embodiment, one or more of the supports 62 (here gussets) each includes a channel 102 (see also FIG. 6). This channel 102 may extend radially down into the support 62. The channel 102 and, thus, the support 62 is configured to receive and accommodate the plenum 94, which extends circumferentially along the aft portion 86 of the outer barrel 54.

The ALFC system 90 of the present disclosure, of course, is not limited to the exemplary configuration described above. For example, in some embodiments, there may be no perforations forward of the aft bulkhead 60 or aft of the aft bulkhead 60 and, thus, respectively no active laminar flow control forward of the aft bulkhead 60 or aft of the aft bulkhead 60. In some embodiments, the plenum 94 may be replaced by a plurality of plenums. Of course, various other ALFC system configurations may be implemented with the nacelle inlet 42 of the present disclosure.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A nacelle inlet for an aircraft propulsion system, the nacelle inlet comprising:
    an outer barrel extending around an axis and along the axis to an aft end;
    a bulkhead within and connected to the outer barrel, wherein an aft portion of the outer barrel projects aftward axially from the bulkhead to the aft end;
    a plurality of supports disposed around the axis and next to the bulkhead, the supports configured to support the aft portion of the outer barrel; and
    a plurality of plenums for an active laminar flow control system, wherein the outer barrel is perforated with a plurality of perforations that are respectively fluidly coupled with the plenums, wherein at least two of the plenums are axially forward of the bulkhead, and wherein at least one of the plenums is axially aft of the bulkhead.

2. The nacelle inlet of claim 1, wherein a first of the supports comprises a gusset.

3. The nacelle inlet of claim 1, wherein a first of the supports comprises a strut.

4. The nacelle inlet of claim 1, wherein a first of the supports is mounted to and extends between the bulkhead and the aft portion of the outer barrel.

5. The nacelle inlet of claim 1, further comprising a fan containment case attachment ring, wherein the bulkhead and a first of the supports are independently mounted to the attachment ring.

6. The nacelle inlet of claim 1, further comprising a second bulkhead within and connected to the outer barrel, wherein the bulkhead is axially between the second bulkhead and the aft end.

7. The nacelle inlet of claim 1, further comprising an inlet lip forming an inlet orifice of the nacelle inlet, wherein at least a circumferential portion of the inlet lip and a circumferential portion of the outer barrel are integrally formed together from a monolithic outer skin.

8. The nacelle inlet of claim 1, further comprising an inlet lip forming an inlet orifice of the nacelle inlet, wherein the inlet lip is discrete from and attached to the outer barrel.

9. The nacelle inlet of claim 1, further comprising an acoustic panel circumscribed by the outer barrel, wherein the aft portion of the outer barrel projects axially beyond and aft of the acoustic panel to the aft end.

10. An assembly for an aircraft propulsion system, the assembly comprising:
   a fan containment case extending along an axis;
   a nacelle inlet extending along the axis and around the fan containment case, the nacelle inlet including a bulkhead, an outer skin and a plurality of supports;
   the bulkhead within and connected to the outer skin;
   the outer skin axially overlapping the fan containment case; and
   the supports disposed around the axis and configured to support the outer skin over the fan containment case; and
   a plurality of plenums for an active laminar flow control system, wherein the outer skin is perforated with a plurality of perforations that are respectively fluidly coupled with the plenums, wherein at least two of the plenums are axially forward of the bulkhead, and wherein at least one of the plenums is axially aft of the bulkhead.

11. The assembly of claim 10, wherein a first of the supports comprises a gusset mounted to and extending between the bulkhead and the outer skin.

12. A nacelle inlet for an aircraft propulsion system, the nacelle inlet comprising:
   an outer barrel extending around an axis and along the axis to an aft end;
   a bulkhead within and connected to the outer barrel, wherein an aft portion of the outer barrel projects aftward axially from the bulkhead to the aft end;
   a plurality of supports disposed around the axis and next to the bulkhead, the supports configured to support the aft portion of the outer barrel; and
   a plurality of plenums for an active laminar flow control system, wherein the outer barrel is perforated with a plurality of perforations that are respectively fluidly coupled with the plenums, wherein a first of the plenums is axially forward of the bulkhead, and wherein a second of the plenums is axially aft of the bulkhead.

* * * * *